United States Patent
Reijonen

(10) Patent No.: US 10,116,232 B2
(45) Date of Patent: Oct. 30, 2018

(54) COLLOCATION OF RADIATION GENERATOR COMPONENTS FOR LIMITED-SPACE DEVICES

(71) Applicant: Schlumberger Technology Corporation, Sugar Land, TX (US)

(72) Inventor: Jani Petteri Reijonen, Princeton, NJ (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 23 days.

(21) Appl. No.: 14/975,640

(22) Filed: Dec. 18, 2015

(65) Prior Publication Data

US 2017/0176633 A1 Jun. 22, 2017

(51) Int. Cl.
*H02M 7/10* (2006.01)
*G01V 11/00* (2006.01)
*G01V 5/08* (2006.01)

(52) U.S. Cl.
CPC .............. *H02M 7/106* (2013.01); *G01V 5/08* (2013.01); *G01V 11/002* (2013.01)

(58) Field of Classification Search
None
See application file for complete search history.

(56) References Cited

U.S. PATENT DOCUMENTS

| | | | | |
|---|---|---|---|---|
| 3,539,903 A * | 11/1970 | Goebel | ................. | H02M 7/103 307/110 |
| 3,902,108 A * | 8/1975 | Sion | ...................... | B05B 5/0531 363/61 |
| 5,331,255 A * | 7/1994 | Banbury | ............... | H02M 7/106 315/411 |
| 5,734,256 A | 3/1998 | Larsen et al. | | |
| 6,154,382 A * | 11/2000 | Kawahara | ............. | H02M 7/103 363/61 |
| 7,564,948 B2 | 7/2009 | Wraight et al. | | |
| 7,991,111 B2 * | 8/2011 | Wraight | .................. | H01J 35/06 378/119 |
| 8,203,858 B2 * | 6/2012 | Hanington | ............ | H02M 7/106 363/61 |
| 8,742,328 B2 * | 6/2014 | Simon | ..................... | G01V 5/125 250/254 |
| 2006/0244645 A1 | 11/2006 | Ozalevli et al. | | |

(Continued)

FOREIGN PATENT DOCUMENTS

WO 2013040402 A2 3/2013

OTHER PUBLICATIONS

International Search Report and Written Opinion issued in the Related PCT Application PCT/US2016/066428, dated Aug. 1, 2017 (10 pages).

*Primary Examiner* — Michael Logie
(74) *Attorney, Agent, or Firm* — Michael Dae

(57) ABSTRACT

A compact radiation generator for use in a downhole well-logging tool is disclosed. The compact radiation generator comprises a housing with a cavity, a linear acceleration tube in the cavity that generates radiation when supplied with a sufficiently high voltage, and a first voltage multiplier ladder in the cavity configured to supply the sufficiently high voltage to the acceleration tube. The first voltage multiplier ladder is folded into two linear parts that are collocated to each other.

20 Claims, 7 Drawing Sheets

(56) References Cited

U.S. PATENT DOCUMENTS

| | | | |
|---|---|---|---|
| 2008/0107235 A1* | 5/2008 | Sundaram | H05G 1/10 378/101 |
| 2008/0159480 A1* | 7/2008 | Wraight | H01J 35/06 378/89 |
| 2013/0082790 A1 | 4/2013 | Trivedi et al. | |
| 2013/0208841 A1* | 8/2013 | Perkins | G21G 4/02 376/114 |
| 2014/0270083 A1* | 9/2014 | Dinsmore | H01J 35/025 378/109 |
| 2015/0055747 A1 | 2/2015 | Simon et al. | |
| 2015/0055748 A1* | 2/2015 | Simon | E21B 47/1015 378/51 |
| 2015/0219720 A1 | 8/2015 | Huh | |
| 2015/0231408 A1 | 8/2015 | Williams et al. | |
| 2017/0179818 A1 | 6/2017 | Gould et al. | |

\* cited by examiner

COLLOCATION OF RADIATION GENERATOR COMPONENTS FOR LIMITED-SPACE DEVICES

BACKGROUND

This disclosure relates to a compact arrangement of for an electronic radiation generator.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Electronic radiation generators are used by many downhole well-logging tools. The electronic radiation generators may use high-voltage sources to cause charged particles to accelerate toward a target. When the charged particles strike the target, radiation such as neutrons or x-rays may be generated. The radiation may exit the downhole tool and into a geological formation adjacent a wellbore where the downhole tool is located. Measurements of the radiation that returns to the downhole tool may provide an indication of where hydrocarbon resources may be located, as well as other characteristics of the geology of the formation. In many downhole tools, the radiation generator may be a relatively long device. The linear length of the radiation generator may be a limiting factor, however, for certain compact downhole tools.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In some embodiments, there is disclosed a compact radiation generator for use in a downhole well-logging tool. The compact radiation generator comprises a housing with a cavity, a linear acceleration tube in the cavity that generates radiation when supplied with a sufficiently high voltage, and a first voltage multiplier ladder in the cavity configured to supply the sufficiently high voltage to the acceleration tube. The first voltage multiplier ladder comprises two linear parts disposed parallel to an axis of the compact radiation generator and parallel to each other. The two parts of the first voltage multiplier ladder are connected to one another at a turnover point that is electrically partway through the first voltage multiplier ladder.

In some embodiments, there is disclosed a system comprising a housing with a cavity, a linear acceleration tube in the cavity that generates radiation when supplied with a sufficiently high voltage, and a first voltage multiplier ladder in the cavity configured to supply the sufficiently high voltage to the acceleration tube. The first voltage multiplier ladder is folded at a first turnover point to form a first linear part and a second linear part. The first linear part and the second linear part are collocated to each other, and at least one of the first linear part and the second linear part comprises a first driver, a first transformer, or both.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
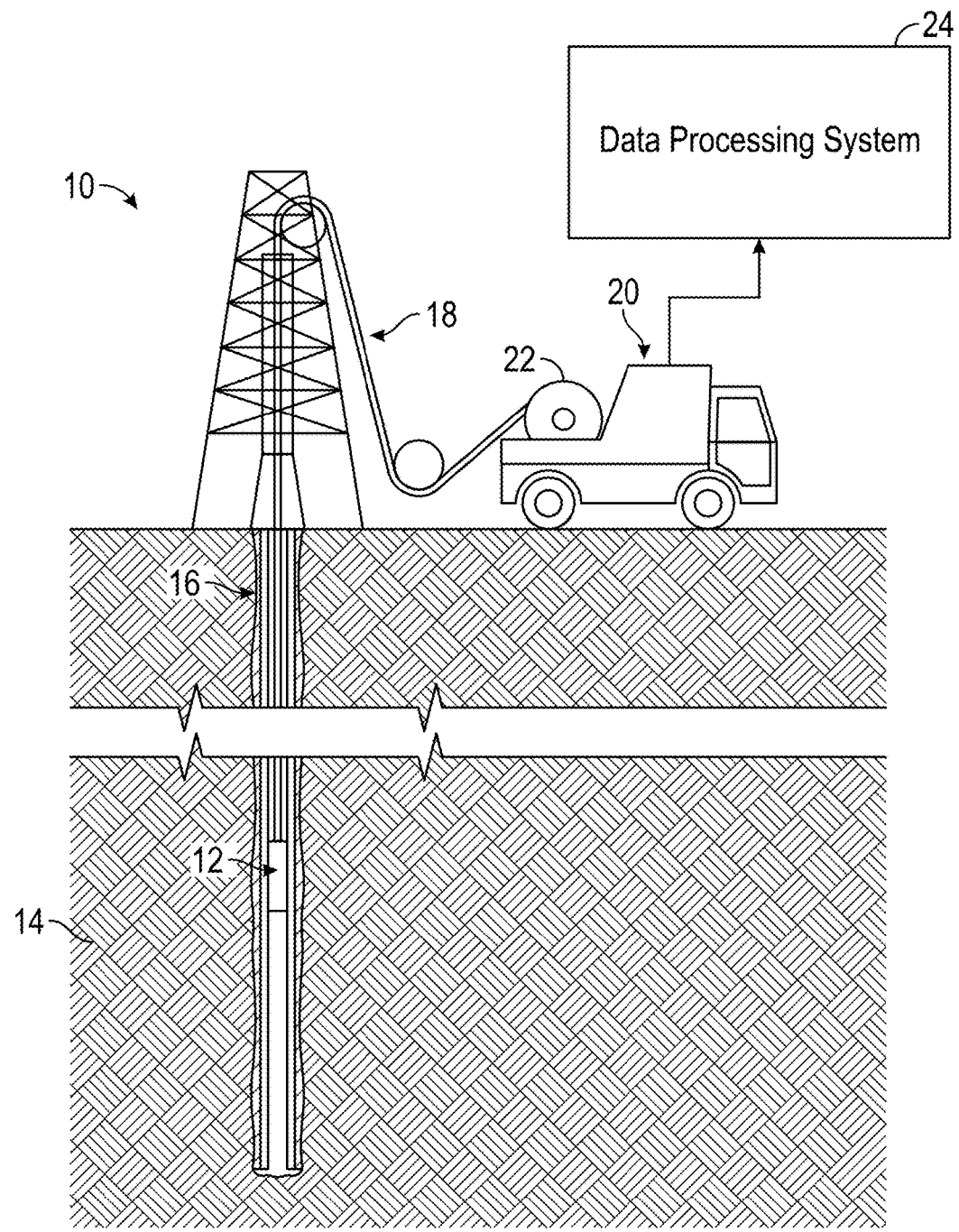
FIG. 1 is a schematic diagram of a well site system that may employ a compact radiation generator in a downhole tool, in accordance with an embodiment.

One or more specific embodiments of the present disclosure will be described below. These described embodiments are examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

A downhole tool may use an electronic radiation generator to generate radiation. The radiation generator may use a high-voltage power supply using a voltage multiplier ladder to accelerate charged particles toward a target material. When the charged particles strike the target material, the target material may produce radiation such as x-rays or neutrons. The radiation may be used by the downhole tool to assess properties of a well, which may indicate the presence or absence of hydrocarbons at particular locations in the geological formation that surrounds the well. The downhole tool may also use the radiation to identify many other properties of the geological formation, such as porosity, lithology, density, and so forth.

Radiation generators—whether unipolar or bipolar—may be relatively long devices. Some downhole devices, however, may be constrained by length. As such, this disclosure describes systems and methods to shorten the length of the radiation generator by collocating certain components of the radiation generator. Some examples fold relatively lower-voltage components of the radiation generator over to collocate them together to form a compact radiation generator. These may include, for example, a driver and a transformer of the voltage multiplier ladder. Some other examples fold the voltage multiplier ladder at a particular stage to enable electrical measurements to be tapped at that stage of the voltage multiplier ladder. Folding the voltage multiplier ladder at higher-voltage locations may also be done to provide greater shortening in length of the compact radiation generator.

With this in mind, FIG. 1 illustrates a well-logging system 10 that may employ the systems and methods of this disclosure. The well-logging system 10 may be used to convey a downhole tool 12 that includes such scintillator detectors through a geological formation 14 via a wellbore 16. The downhole tool 12 may be conveyed on a cable 18 via a logging winch system 20. Although the logging winch system 20 is schematically shown in FIG. 1 as a mobile logging winch system carried by a truck, the logging winch system 20 may be substantially fixed (e.g., a long-term installation that is substantially permanent or modular). Any suitable cable 18 for well logging may be used. The cable 18 may be spooled and unspooled on a drum 22.

Although the downhole tool 12 is described as a wireline downhole tool, it should be appreciated that any suitable conveyance may be used. For example, the downhole tool 12 may instead be conveyed as a logging-while-drilling (LWD) tool as part of a bottom hole assembly (BHA) of a drill string, conveyed on a slickline or via coiled tubing, and so forth. For the purposes of this disclosure, the downhole tool 12 may be any suitable measurement tool that generates radiation using an electronic radiation generator powered by a voltage multiplier ladder controlled in the manner of this disclosure. The downhole tool 12 may provide radiation measurements (e.g., counts of detected gamma-rays or x-rays) to a data processing system 24 via any suitable telemetry (e.g., via electrical signals pulsed through the geological formation 14 or via mud pulse telemetry). The data processing system 24 may process the radiation measurements to identify certain properties of the wellbore 16 (e.g., porosity, permeability, relative proportions of water and hydrocarbons, and so forth) that may be otherwise indiscernible by a human operator.

By way of example, the data processing system 24 may include a processor, which may execute instructions stored in memory and/or storage. As such, the memory and/or the storage of the data processing system 24 may be any suitable article of manufacture that can store the instructions. The memory and/or the storage may be ROM memory, random-access memory (RAM), flash memory, an optical storage medium, or a hard disk drive, to name a few examples. A display, which may be any suitable electronic display, may provide a visualization, a well log, or other indication of properties of the wellbore 16.

Figure 2:
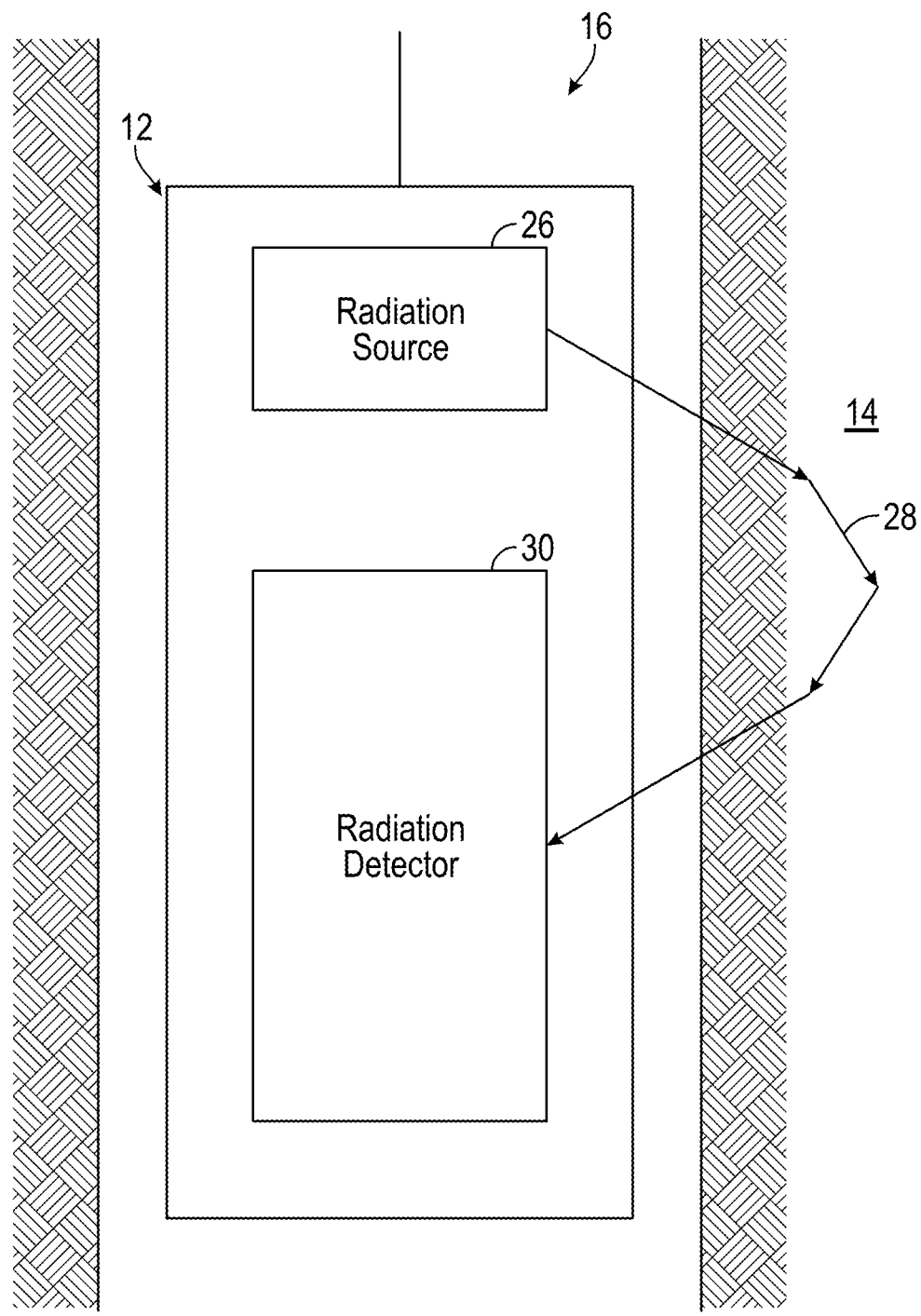
FIG. 2 is a block diagram of the downhole tool that may employ the compact radiation generator, in accordance with an embodiment.

One example of the downhole tool 12 is shown in FIG. 2. The downhole tool 12 may include a radiation source 26 to emit radiation 28 into the geological formation 14. The radiation source includes an electronic radiation generator, such as an electronic x-ray generator or an electronic neutron-generator. The radiation source 26 emits radiation 28 out of the downhole tool 12. For example, the radiation 28 may enter the geological formation 14, where it may scatter or collide with atoms of the geological formation 14 to generate other radiation that also may scatter. Some of the radiation 28 or radiation that results from interactions with the radiation 28 in the geological formation 14 may scatter and return to the downhole tool 12, to be detected by a radiation detector 30. In general, the radiation detector 30 may detect when ionizing radiation enters the downhole tool 12 and generate an electrical signal, such as a count rate of detected radiation or spectrum of detected radiation that may provide an indication of characteristics of the wellbore 16 or the geological formation 14.

Figure 3:
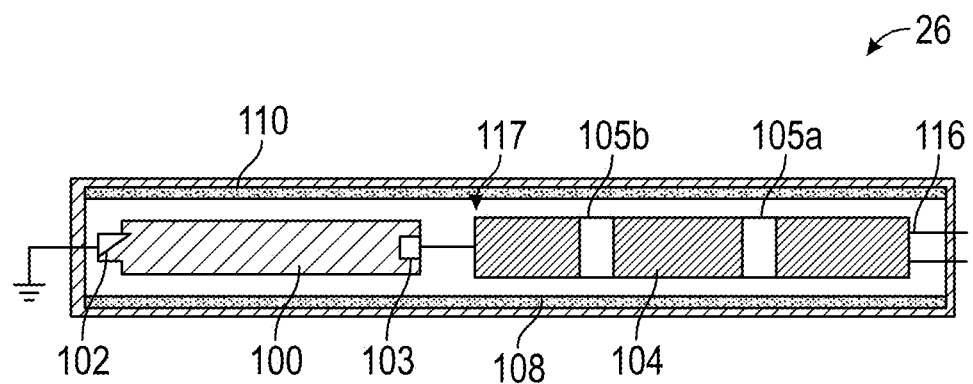
FIG. 3 is a block diagram of a radiation generator that uses the voltage multiplier ladder, in accordance with an embodiment.

One example of the radiation generator 26 is shown in FIG. 3. In the illustrated example, the radiation generator is an X-ray generator that includes an acceleration tube 100 that is grounded at a target (i.e., anode) end 102, although floating target configurations may also be used in some embodiments. The acceleration tube 100 further illustratively includes a cathode 103 on the opposite end of the tube from the target end 102. The cathode 103 is coupled to a voltage multiplier ladder 104 that includes mid-stage loading coils 105a, 105b. In some embodiments, the voltage multiplier ladder 104 may take a form as described by U.S. Published Application No. 2015/00550747, "Energy Radiation Generator with Bi-Polar Voltage Ladder," which is incorporated by reference in its entirety for all purposes. The voltage multiplier ladder 104 is coupled to a transformer 106 (shown in FIG. 5). The acceleration tube 100, voltage multiplier ladder 104, and the transformer 106 are enclosed within one or more insulating sleeves 108 (e.g., PFA), which in turn is enclosed within a generator housing 110. An insulating gas may be inserted in an inner space 117 within the generator housing 110. The voltage multiplier ladder 104 further includes an input 116 to receive an AC voltage. The grounded target configuration shown schematically in FIG. 3 provides a simplification in the mechanical design and assembly, which may also help in maintaining mechanical stability of the target, maintaining thermal management of the target, as well as the radiation exposure of the insulating material 108. These components may be electrically insulated from one another in part by an insulating gas, such as SF6.

Figure 4:
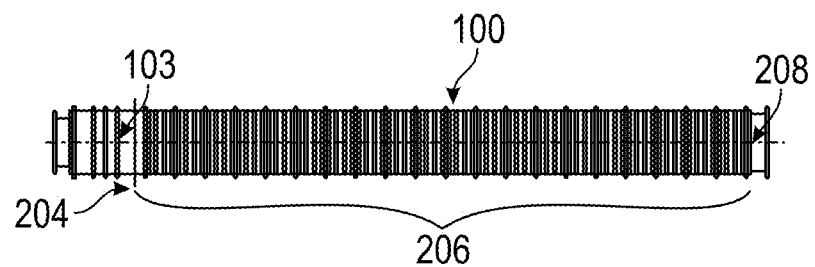
FIG. 4 is an example of an acceleration tube that receives high-voltage signals from the voltage multiplier ladder, in accordance with an embodiment.

The cathode 103 releases electrons in response to exposure to heat, although in some embodiments "cold" cathodes (e.g., Carbon nanotubes, etc.) may also be used. As shown in FIG. 4, the voltage multiplier ladder 104 applies a voltage to the cathode 103, and the introduction of current heats the cathode 103 and causes it to release electrons. A grid 204 moves electrons released from the cathode 103 toward an electron-accelerating section 206. The accelerating section 206 speeds electrons toward a target 208. Upon collision with the target 208, X-rays are generated which may be used in various applications, such as downhole well-logging measurements.

Figure 5:
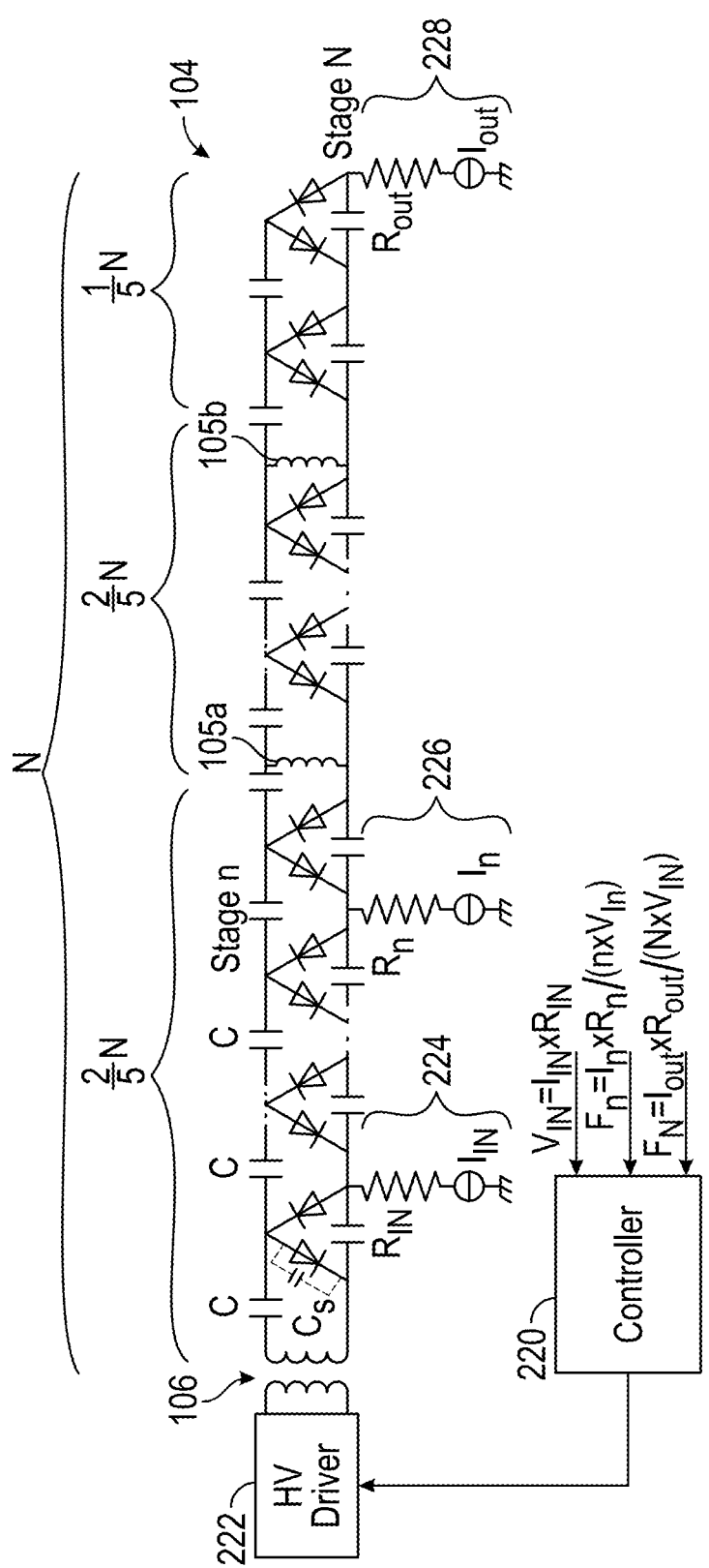
FIG. 5 is a circuit diagram of an unipolar voltage multiplier ladder, in accordance with an embodiment.

To generate higher voltages (e.g., of 400 kV or more) using a unipolar ladder, one or more loading coils may be positioned at appropriate intermediate locations or positions in the voltage multiplier ladder. As illustrated in FIG. 5, the first and second coils 105a, 105b may be positioned two-fifths and four-fifths stage positions, respectively, down the length of the voltage multiplier ladder 104. In some embodiments, the voltage multiplier ladder 104 may take a form as described by U.S. Published Application No. 2015/0055747, "Energy Radiation Generator With Bi-Polar Voltage Ladder," and U.S. Published Application No, 2015/0055748, "Energy Radiation Generator With Uni-Polar Voltage Ladder," which are incorporated by reference in its entirety for all purposes.

The first coil 105a and the second coil 105b may be substantially identical to one another, respectively positioned at about $2/5^{th}$ and $4/5^{th}$ along the length of the voltage multiplier ladder 104. In this configuration an optimal voltage efficiency $F_{opt}$ may be derived using the C, $C_s$ and N by using the square root of the ratio of the $C_s$ and C multiplied by the N, such as:

$$F_{opt} = \frac{\tanh\left(2N\sqrt{\frac{C_S}{C}}\right)}{2N\sqrt{\frac{C_S}{C}}}, \quad (1)$$

where C is the voltage multiplier ladder series capacitor, $C_s$ is the stray capacitance, and N is the number of voltage multiplication stages of the voltage multiplier ladder 104. If the optimal voltage efficiency were treated as a constant value, the optimal frequency $f_{opt}$ of the voltage multiplier ladder may be given by the equation:

$$f_{opt} = \frac{1}{2\pi}\sqrt{\frac{1}{L\sqrt{CC_S}} \cdot \frac{1}{\tanh\left(\frac{2}{5}N\sqrt{\frac{C_S}{C}}\right)}}, \quad (2)$$

where C is the voltage multiplier ladder series capacitor, $C_s$ is the parasitic capacitance between the AC and DC leg of the voltage multiplier ladder, and N is the number of voltage multiplication stages of the voltage multiplier ladder 104.

It should be noted that in the example illustrated in FIG. 5, the capacitor of each stage is depicted as being the same for the entire length of the voltage multiplier ladder. However, this example is provided for the simplicity of illustration only. Variations to this design are possible. For example, different capacitors and/or diodes with different ratings can be used in different stages of the voltage multiplier ladder. A "tapered" configuration is also possible, such as having higher rated capacitors and/or diodes at the beginning of the voltage multiplier ladder and lower rated capacitors and/or diodes towards the end of the voltage multiplier ladder. The tapering can be gradual (from stage to stage), or stepped (from a group of stages to a next group of stages), or a combination thereof. All such variations can be modeled and/or mathematically calculated based on variations to the equations disclosed herein.

During operation, the electrical characteristics of the voltage multiplier ladder 104 may vary as the downhole tool 12 moves through the wellbore 16. As such, the voltage multiplier ladder 104 shown in FIG. 6 may be regulated by a controller 220 that adjusts the operating frequency and a magnitude of an input voltage supplied by a high-voltage driver 222 into the voltage multiplier ladder 104 via the transformer 106. The controller 220 may include, for example, an application-specific integrated circuit (ASIC); a programmable logic device, such as a field-programmable gate array (FPGA); a processor and memory storing instructions to perform regulation of the voltage multiplier ladder; some combination of these; or the like.

The controller 220 may use any suitable method to regulate the voltage multiplier ladder 104. Exemplary embodiments can be found in co-pending, co-assigned, and concurrently filed patent application titled "Systems and Methods for Controlling a Voltage Multiplier Ladder for Optimal Efficiency and Minimal Component Stress", by Darren Gould and Jani Reijonen, the entire content of which is incorporated herein by reference. In particular, one embodiment involves regulating the optimal voltage efficiency $F_{opt}$ in a control loop. For example, test circuitry 224, 226, and 228 may measure the voltage at certain stages of the voltage multiplier ladder 104. Namely, the test circuitry 224 may measure the voltage at the input stage of the voltage multiplier ladder 104, the test circuitry 226 may measure the voltage at a stage n of the voltage multiplier ladder 104, and the test circuitry 228 may measure the voltage at the output stage of the voltage multiplier ladder 104. Although the test circuitry 226 is shown once in the example of FIG. 5, other examples may include many instances of the test circuitry 226 at various stages n throughout the total N stages of the voltage multiplier ladder 104 between the input stage and the output stage of the voltage multiplier ladder 104. The stage n that is selected for testing may be any suitable interim stage that is used to regulate the optimal voltage efficiency $F_{opt}$ in the control loop.

As shown in FIG. 5, the test circuitry 224, 226, and 228 may use a bleed resistor (R) and a current (I) sensor to obtain voltage (e.g., V=IR), though any other suitable circuitry may be used. The efficiency at any stage n or stages in the voltage multiplier ladder 104 may be measured with the respective bleed resistor $R_n$ and an appropriate measurement circuit for current sensing to determine the bleed current $I_n$, along with the first stage voltage $V_{in}$, using the equation below:

$$F_n = \frac{I_n R_n}{n V_{in}}. \quad (3)$$

For example, the controller 220 may receive three inputs: measurements that enable determination of a voltage input signal $V_{in}$, an output voltage efficiency $F_N$ representing the voltage efficiency at the output stage of the voltage multiplier ladder 104, and a mid-stage voltage efficiency $F_n$ representing the voltage efficiency at a stage n of the voltage multiplier ladder 104. Using measurements from the test circuitry 224, the voltage input signal $V_{in}$ may be identified according to the following relationship:

$$V_N = I_{IN} \times R_{IN} \quad (4),$$

where $R_{IN}$ represents a resistance of the bleed resistor of the test circuitry 224 and $I_{IN}$ represents a current measured at the test circuitry 224.

Using measurements from the test circuitry 224 and 228, the output voltage efficiency $F_N$ may be identified according to the following relationship:

$$F_N = I_{OUT} \times R_{OUT} / (N \times V_{IN}) \quad (5),$$

where $R_{OUT}$ is the resistance of the bleed resistor of the test circuitry 228 and the $I_{OUT}$ is the current measured by the test circuitry 228, N is the number of the last stage of the voltage multiplier ladder 104, and $V_{IN}$ is the input voltage measured at the test circuitry 224 according to Equation 4.

Using measurements from the test circuitry 224 and 226, the mid-stage voltage efficiency $F_n$ may be identified according to the following relationship:

$$F_n = I_n \times R_n / (n \times V_{IN}) \quad (6),$$

where $R_n$ is the resistance of the bleed resistor of the test circuitry 226, $I_n$ is the current measured by the test circuitry 226, n is the number of the stage of the voltage multiplier ladder 104 where the test circuitry 226 is located, and $V_{in}$ is the input voltage measured at the test circuitry 224 according to Equation 4. It should be appreciated that the values from Equations 4, 5, and 6 may be calculated by the controller 220 or may be provided as inputs (e.g., via some prior calculation circuitry that provides the outputs of Equations 4, 5, and 6 as inputs into the controller 220).

The control loop of the controller 220 thus may regulate the voltage efficiency at any stage n such that $F_n = F_N$, where $F_N$ is the voltage efficiency of the last stage. This may allow for dynamic control over the voltage multiplier ladder 104 despite changes to the optimal due to variations in components, parasitic characteristics, and environmental conditions such as temperature. Once the optimal frequency is set, to achieve the desired output voltage, the input voltage to the high-voltage driver 222, and thus the transformer 106, may be adjusted by the controller 220. In other examples, the controller 220 may regulate the voltage efficiency to some defined constant value that is not dynamically updated.

Figure 6:
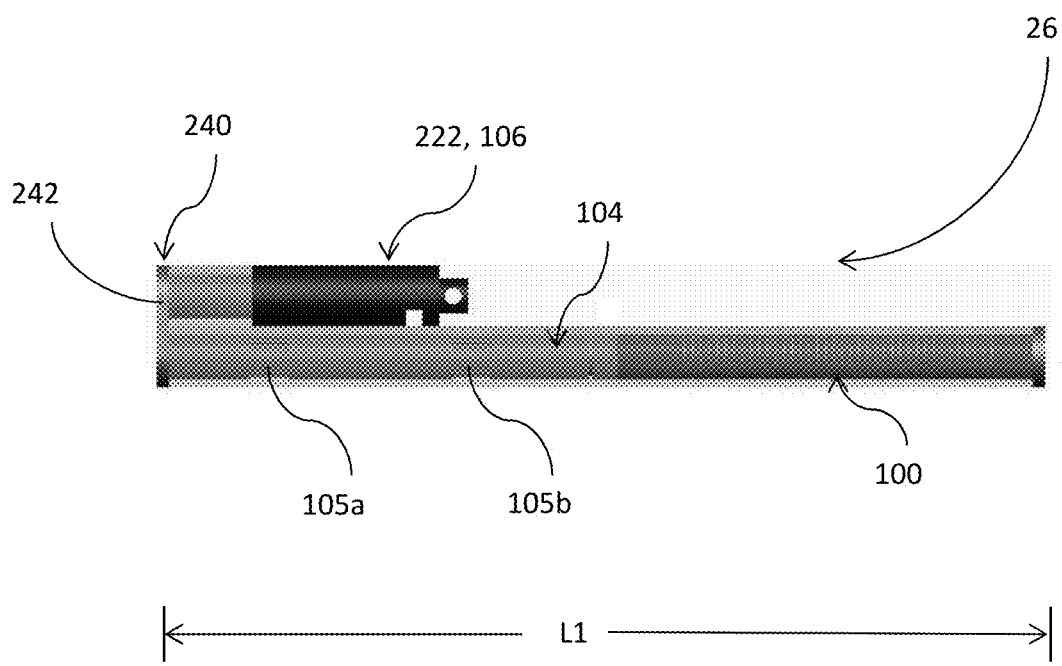
FIG. 6 is a schematic diagram of a compact radiation generator having a unipolar folded voltage multiplier ladder with a turnover point selected to enable test circuitry to tap a particular stage n of the voltage multiplier ladder, in accordance with an embodiment.
Figure 7:
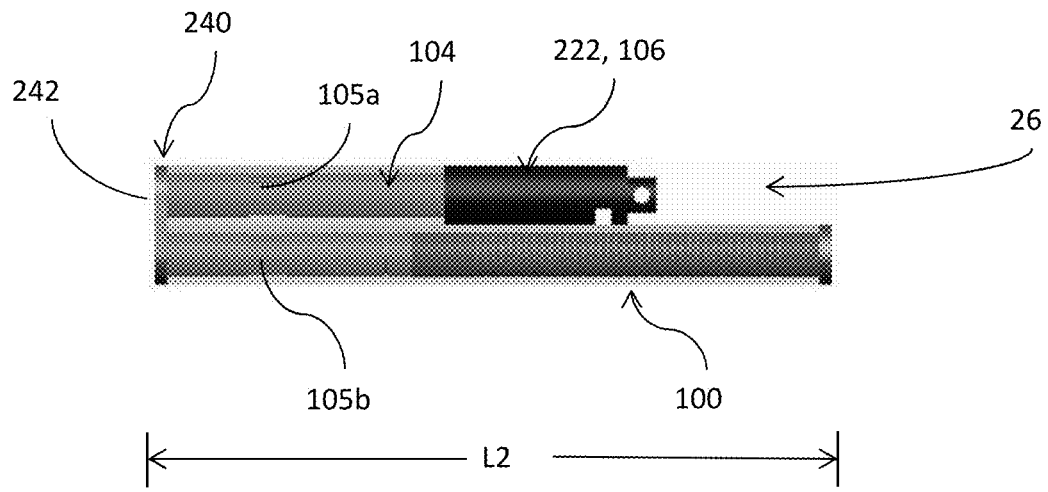
FIG. 7 is a schematic diagram of another compact radiation generator having a unipolar folded voltage multiplier ladder with a different turnover point, in accordance with an embodiment.
Figure 8:
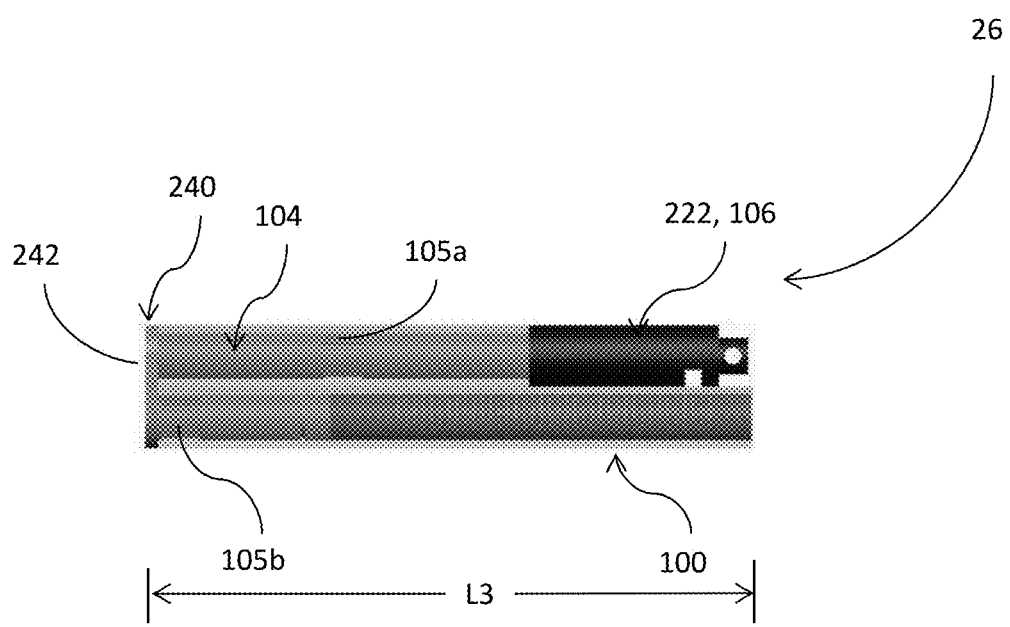
FIG. 8 is a schematic diagram of another compact radiation generator having a unipolar folded voltage multiplier ladder with a different turnover point, in accordance with an embodiment.
Figure 9:
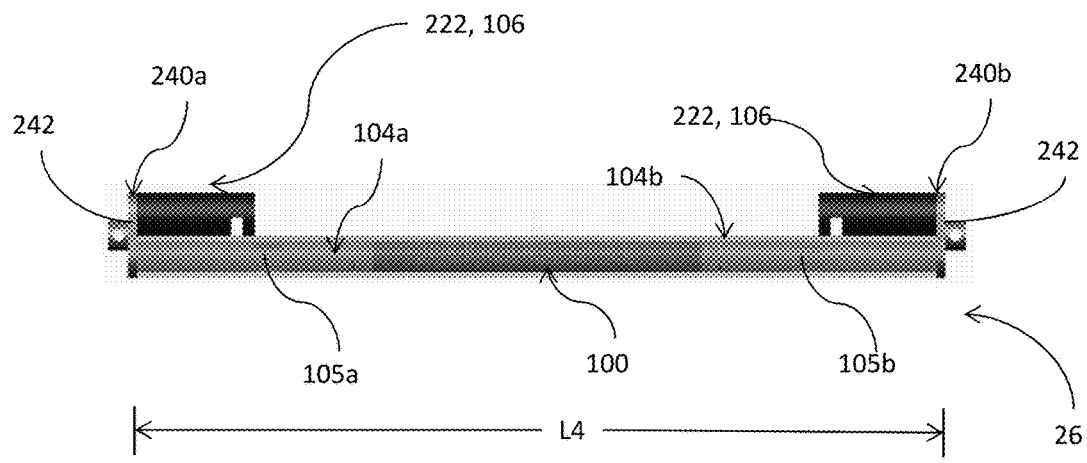
FIG. 9 is a schematic diagram of a compact radiation generator having bipolar folded voltage multiplier ladders, in accordance with an embodiment.
Figure 10:
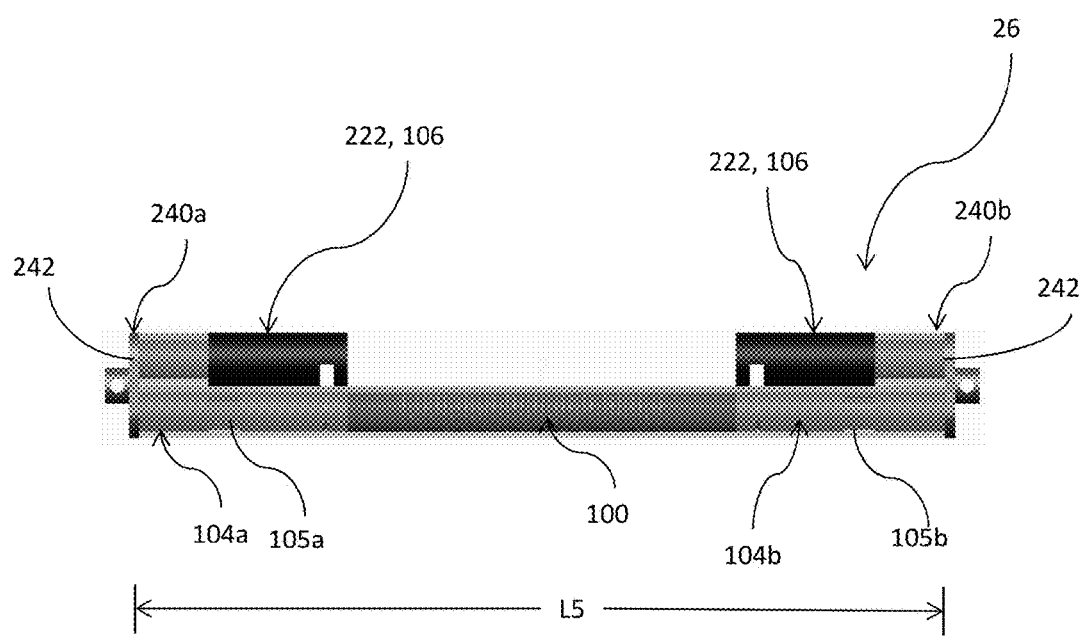
FIG. 10 is a schematic diagram of another compact radiation generator having bipolar folded voltage multiplier ladders, in accordance with an embodiment.

Regardless of the control scheme, the radiation generator 26 may be made compact by folding over the voltage multiplier ladder 104, as shown by FIGS. 6-10. Before discussing each of these individually, it should be first understood that the examples of the radiation generator 26 shown in FIGS. 6-10 may be understood to be mounted in a larger pressure housing in the manner discussed above with reference to FIG. 2. Thus, the various components shown in these figures may be understood to be placed in a grounded insulation gas (e.g., SF6) housing, which has bulkheads sealing both sides, and cavities where the components of the radiation generator 26 are held. This insulating gas pressure housing may be subsequently placed into a pad or pressure housing in general with detectors and the associated electronics, in a manner shown in FIG. 2. When the term "collocated" is used below, it refers to the lateral placement of some components of a tool nearby certain other components of the tool, where these components would otherwise typically be arranged in a linear fashion. These components may be placed near enough to save space but with sufficient distance to prevent electrical failures. It should also be appreciated that FIGS. 6-8 represent unipolar configurations of a compact radiation generator 26, while FIGS. 9-10 represent bipolar configurations. However, various aspects of the unipolar configurations may be used in bipolar configurations, and various aspects of the bipolar configurations may be used in unipolar configurations. Indeed, the examples illustrated in FIGS. 6-10 are intended to provide examples of configurations of compact radiation generators 26. The examples shown in FIGS. 6-10 are not meant to be exhaustive.

With reference to FIG. 6, the compact radiation generator 26 may have a configuration that allows for a particular tap point to be more easily accessed to aid in regulation of the voltage multiplier ladder 104. In the example of FIG. 6, a turnover point 240 divides the voltage multiplier ladder 104 to reduce the total length of the compact radiation generator 26 parallel to an axis of the compact radiation generator 26 (represented as a length L1 in FIG. 6). The voltage multiplier ladder 104 thus partially extends over the turnover point 240 through a conductive transfer circuitry 242. The conductive transfer circuitry 242 may represent any suitable circuitry to connect the folded-over parts of the voltage multiplier ladder 104. On one side of the turnover point 240 are the relatively lower-voltage components of the voltage multiplier ladder 104, which may include the high-voltage driver 222 and/or the transformer 106. On the other side of the turnover point 240 are the relatively higher-voltage components of the voltage multiplier ladder 104 that connect to the acceleration tube 100.

FIG. 6 shows a configuration of the compact radiation generator 26 in which the turnover point 240 occurs at an intermediate stage n of the voltage multiplier ladder 104. Thus, the particular intermediate stage n that may also be used in the regulation of the voltage multiplier ladder 104 may be selected for the turnover point 240. The conductive transfer circuitry 242 may thus also include the tap point for the test circuitry 226. Additionally or alternatively, the turnover point 240 may occur at the input stage, in which case the conductive transfer circuitry 242 may thus also include the tap point for the test circuitry 224.

Another aspect of the configuration of FIG. 6 of note is that the voltage multiplier ladder 104 is folded over at a relatively lower-voltage point among the stages of the voltage multiplier ladder 104. Indeed, as mentioned above, the voltage multiplier ladder 104 may successively increase the total voltage over the stages of the voltage multiplier ladder 104. Collocating the relatively lower voltage components of the voltage multiplier ladder 104, by selecting the turnover point 240 at an intermediate stage n occurring before the first loading coil 105a, may reduce a likelihood of possible failure due to of electrical stresses between the folded-over collocated components of the voltage multiplier ladder 104. The possibility of failure due to electrical stresses may be further reduced by selecting the turnover point 240 to be located at the input stage or before.

As may be appreciated, selecting different turnover points 240 may allow for different lengths of the compact radiation generator 26 to be achieved. Selecting different turnover points 240 may also allow for different stages n of the voltage multiplier ladder 104 to be tapped for measuring voltage characteristics for regulating the voltage multiplier ladder 104. Thus, in some examples, the voltage multiplier tube 104 may be folded at a different stage n, as desired, as generally shown in FIGS. 7 and 8. Indeed, in FIG. 7, the turnover point 240 occurs at a point in the voltage multiplier ladder 104 where the loading coils 105a and 105b may substantially align. This may enable relatively easier manufacturing of the compact radiation generator 26 because the loading coils 105a, 105b may be installed, tested, and/or fine-tuned at the same time. In the example of FIG. 7, the high-voltage driver 222 and/or the transformer 106 are disposed adjacent to the acceleration tube 100. It may be noted that the turnover point 240 shown in FIG. 7 allows the total length L2 to be smaller than the length L1 of the compact radiation generator 26 shown in FIG. 6. Moreover, in the example of FIG. 7, by collocating just the high-voltage driver 222 and/or the transformer 106 of the voltage multiplier ladder 104 with the acceleration tube 100, certain electrical stresses due to the collocation of the voltage multiplier ladder 104 components and the acceleration tube 100 may be avoided.

FIG. 8 represents another compact radiation generator 26 that has a more compact configuration with a length L3 that is smaller than the lengths L2 of FIG. 7 or L1 of FIG. 6. The compact radiation generator 26 of FIG. 8 has the turnover point 240 selected so that the total length of the compact radiation generator 26 shown in FIG. 8 may be approximately 50% that of a fully extended radiation generator 26. In the example of FIG. 8, the loading coils 105a and 105b may be positioned so that the second loading coil 105b is disposed adjacent to the conductive transfer circuitry 242. This may allow for the stage of the voltage multiplier ladder 104 at the second loading coil 105b to be tapped at the turnover point 240.

In the configuration shown in FIG. 8, the relatively lower-voltage components of the voltage multiplier ladder 104 are collocated with the acceleration tube 100. That is, the high voltage driver 222 and/or the transformer 106, as well as earlier stages of the voltage multiplier ladder 104, are the components of the voltage multiplier ladder 104 that are disposed nearest to the acceleration tube 100. Indeed, in the particular example shown in FIG. 8, just the stages of the voltage multiplier ladder 104 that are lower than or at the first loading coil 105a are collocated with the acceleration tube 100. This may avoid electrical stresses that might occur if the higher stages of the voltage multiplier ladder 104 were collocated with the acceleration tube 100. In FIG. 8, the higher voltage stages of the voltage multiplier ladder 104 are not positioned as collocated with the acceleration tube 100.

While FIGS. 6-8 describe unipolar configurations of the compact radiation generator 26, the compact radiation generator 26 may also take a bipolar configuration. Two examples of a bipolar configuration of the compact radiation generator 26 are shown in FIGS. 9 and 10. In these examples, the acceleration tube 100 is supplied with high voltage of two different polarities from different respective voltage multiplier ladders 104a and 104b. Each of the voltage multiplier ladders 104a and 104b are shown to have respective loading coils 105a and 105b, as well as N stages (e.g., 20 stages each). In some examples, the different voltage multiplier ladders 104a and 104b may have a different respective number of stages $N_1$ and $N_2$.

In the example of FIG. 9, the lowest-voltage components of the voltage multiplier ladders 104a and 104b are folded over at turnover points 240a and 240b. Different conductive transfer circuitry 242 respectively connects the high-voltage drivers 222 and/or transformers 106 of the voltage multiplier ladders 104a and/or 104b. By collocating the relatively lower-voltage components of each voltage multiplier ladder 104a and/or 104b, electrical stresses caused by collocating these components may be induced. While this may not reduce the length L4 from the length of a fully extended radiation generator 26, this may reduce the likelihood of electrical-stress-induced failures. Moreover, in the example of FIG. 9, the high-voltage drivers 222 and/or transformers 106 are collocated with the early stages of the voltage multiplier ladder 104a and 104b up to the respective loading coils 105a and 105b. Thus, the higher stages of the voltage multiplier ladder 104a and 104b beyond the loading coils 105a and 105b may not be collocated with other components of the voltage multiplier ladder 104 in this example.

FIG. 10 is another example of a bipolar compact radiation generator 26. In the example of FIG. 10, the bipolar compact radiation generator 26 has a length of L5, slightly smaller than the length L4, because the turnover points 240a and 240b fold the voltage multiplier ladders 104a and 104b at some intermediate stage in the voltage multiplier ladder 104a and/or 104b. The particular intermediate stage where the turnover points 240a and 240b respectively occur in the voltage multiplier ladder 104a and 104b may differ. As also mentioned above, the particular voltage multiplier ladder stage n where the turnover points 240a and/or 240b occur may be selected to enable access to a particular tap point along the voltage multiplier ladders 104a and/or 104b (e.g., to locate test circuitry similar to the test circuitry 226 shown in FIG. 5) to measure voltage or current at that stage for regulating the voltage multiplier ladders 104a and/or 104b.

It may be noted that, in FIG. 10, the components of the voltage multiplier ladders 104a and 104b are not collocated with the acceleration tube 100. While this may provide a reduced likelihood of failure due to electrical stresses, this is not meant to exclude such configurations. Indeed, it should be understood that, in a manner similar to those shown in FIGS. 7 and 8, the turnover points 240a and 240b for the bipolar configuration of the compact radiation generator 26 may be selected to collocate components of the voltage multiplier ladder 104a and 104b alongside the acceleration tube 100. In some of these examples, just the lowest-voltage components of the voltage multiplier ladders 104a and/or 104b may be collocated with the voltage acceleration tube 100 (e.g., in one embodiment, just the high-voltage driver 222 and/or transformer 106). In other examples, the lower stages of the voltage multiplier ladders 104a and/or 104b may be collocated with the voltage acceleration tube 100 (e.g., in one embodiment, just the initial stages before a first loading coil of the voltage multiplier ladder 104) to allow for a more compact radiation generator 26 with a smaller total length.

Furthermore, as also mentioned briefly above, it should be appreciated that aspects of the bipolar configurations shown in FIGS. 9 and 10 may also be used in combination with aspects of the unipolar configurations shown in FIGS. 6, 7, and 8, and vice-versa. For instance, one example that is envisaged is a unipolar configuration in which the turnover point 240 occurs so that only the high-voltage driver 222 and/or transformer 106 are collocated with other components of the voltage multiplier ladder 104, similar to the manner illustrated in FIG. 9. In another non-limiting example, the unipolar configuration shown in FIG. 6 may be changed so that the turnover point 240 occurs at a location where the components of the voltage ladder 104 (e.g., the high-voltage driver 222 and/or transformer 106) are disposed such that these components are not collocated directly with the acceleration tube 100, in the manner shown in FIG. 10. Indeed, the various principles described above with reference to the various different configurations shown in FIGS. 6-10 may be used in combination with one another. In another example, a bipolar configuration similar to those shown in FIGS. 9 and 10 may have only one of the two voltage multiplier ladders 104a or 104b in a folded configuration, leaving the other one non-folded. In sum, the examples provided above are not intended to be exhaustive, but rather are intended to provide various examples of compact radiation generator configurations that may reduce a total length of the radiation generator, allow for easier access to a tap point along a voltage multiplier ladder to enable regulation of the voltage multiplier ladder, and/or to enable easier or more efficient manufacturing of the compact radiation generator.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

The invention claimed is:

1. A compact radiation generator for use in a downhole well-logging tool, the compact radiation generator comprising:
   a housing comprising a cavity and an axis down a length of the housing;
   a linear acceleration tube in the cavity that generates radiation when supplied with a sufficiently high voltage; and
   a first voltage multiplier ladder in the cavity configured to supply the sufficiently high voltage to the acceleration tube, wherein the first voltage multiplier ladder comprises a first linear part and a second linear part, wherein the first linear part is electrically coupled to and receives power from a transformer and is disposed parallel to the axis of the compact radiation generator and collocated with the second linear part, wherein the first linear part and the second linear part of the first voltage multiplier ladder are connected to one another at a turnover point that is electrically partway through the first voltage multiplier ladder, wherein the transformer is collocated at a same position along the axis as at least a portion of the second linear part or a portion of the acceleration tube.

2. The compact radiation generator of claim 1, wherein the turnover point occurs between the transformer and the second linear part.

3. The compact radiation generator of claim 1, wherein:
   the first voltage multiplier ladder comprises a plurality of multiplier stages;
   the plurality of multiplier stages includes an input stage, an output stage, and an intermediate point between the input stage and the output stage; and
   the turnover point occurs at the intermediate stage.

4. The compact radiation generator of claim 3, comprising test circuitry at the intermediate stage to enable regulation of the first voltage multiplier ladder.

5. The compact radiation generator of claim 1, wherein:
   the first voltage multiplier ladder comprises a plurality of multiplier stages and a first loading coil disposed between two of the plurality of multiplier stages; and
   the turnover point occurs at the first loading coil.

6. The compact radiation generator of claim 1, wherein:
   the first voltage multiplier ladder comprises a plurality of multiplier stages, a first loading coil disposed between two relatively lower-voltage stages of the plurality of multiplier stages, and a second loading coil disposed between two relatively higher-voltage stages of the plurality of multiplier stages than the first loading coil; and
   the turnover point occurs between the first loading coil and the second loading coil.

7. The compact radiation generator of claim 6, wherein the turnover point occurs at a point substantially equidistant the first loading coil and the second loading coil such that the first loading coil and the second loading coil are substantially collocated with and parallel to one another.

8. The compact radiation generator of claim 1, wherein the compact radiation generator comprises a unipolar configuration with just the first voltage multiplier ladder.

9. The compact radiation generator of claim 1, wherein the compact radiation generator comprises a bipolar configuration with the first voltage multiplier ladder supplying a first polarity voltage and a second voltage multiplier ladder supplying an opposite polarity voltage.

10. The compact radiation generator of claim 1, wherein one of the first linear part and the second linear part of the voltage multiplier ladder comprises at least some components that are substantially collocated parallel to the acceleration tube.

11. The compact radiation generator of claim 1, wherein the turnover point between the first linear part and the second linear part occurs electrically before a loading coil.

12. A system comprising;
   a housing comprising a cavity and an axis down a length of the housing;
   a linear acceleration tube in the cavity that generates radiation when supplied with a sufficiently high voltage; and
   a first voltage multiplier ladder in the cavity configured to supply the sufficiently high voltage to the acceleration tube, wherein the first voltage multiplier ladder is folded at a first turnover point to form a first linear part and a second linear part, wherein the first linear part and the second linear part are collocated to each other and wherein the first linear part is electrically coupled to and receives power from a first transformer, wherein the first transformer is collocated at a same position along the axis as at least a portion of the second linear part or a portion of the acceleration tube.

13. The system of claim 12, wherein the first voltage multiplier ladder comprises a plurality of multiplier stages and wherein the at least one first linear part and the second linear part that comprises the first transformer further comprises a first driver, and one or more initial stages of the plurality of multiplier stages.

14. The system of claim 12, wherein the first turnover point comprises a first conductive transfer circuitry.

15. The system of claim 12, wherein the first turnover point comprises a first test circuitry that is configured to provide a measurement to a first controller, wherein the first controller regulates the first driver, the first transformer, or both.

16. The system of claim 12, wherein:
   the first voltage multiplier ladder comprises a first loading coil; and
   the first turnover point occurs at or adjacent to the first loading coil.

17. The system of claim 12, further comprises a second voltage multiplier ladder, wherein the first voltage multiplier ladder supplies a first polarity voltage and the second voltage multiplier ladder supplies a second polarity voltage that is opposite to the first polarity voltage.

18. The system of claim 17, wherein the second voltage multiplier ladder is folded at a second turnover point to form a third linear part and a fourth linear part, wherein the third linear part and the fourth linear part are collocated to each other.

19. The system of claim 18, wherein the second turnover point comprises a second test circuitry that is configured to provide a measurement to a second controller, wherein the second controller regulates a second driver, a second transformer, or both.

20. The system of claim 18, wherein:
the second voltage multiplier ladder comprises a second loading coil; and
the second turnover point occurs at or adjacent to the second loading coil.

\* \* \* \* \*